US011745809B2

(12) United States Patent
Mandl et al.

(10) Patent No.: US 11,745,809 B2
(45) Date of Patent: Sep. 5, 2023

(54) ACTIVE UNDERBODY PANEL SYSTEMS

(71) Applicant: Magna Exteriors Inc., Concord (CA)

(72) Inventors: Michael Mandl, Bad Gleichenberg (AT); Martin R. Matthews, Troy, MI (US); Thomas E. Cobb, Eastpointe, MI (US)

(73) Assignee: Magna Exteriors Inc., Aurora (CA)

(*) Notice: Subject to any disclaimer, the term of this patent is extended or adjusted under 35 U.S.C. 154(b) by 0 days.

(21) Appl. No.: 17/555,010

(22) Filed: Dec. 17, 2021

(65) Prior Publication Data

US 2022/0105996 A1  Apr. 7, 2022

Related U.S. Application Data

(63) Continuation of application No. 17/022,484, filed on Sep. 16, 2020, now Pat. No. 11,230,332, which is a continuation of application No. 16/303,001, filed as application No. PCT/IB2017/053008 on May 22, 2017, now Pat. No. 10,814,922.

(60) Provisional application No. 62/339,259, filed on May 20, 2016.

(51) Int. Cl.
*B62D 35/02* (2006.01)
*B62D 37/02* (2006.01)

(52) U.S. Cl.
CPC .............. *B62D 35/02* (2013.01); *B62D 37/02* (2013.01); *Y02T 10/82* (2013.01); *Y02T 10/88* (2013.01)

(58) Field of Classification Search
CPC ................................ B62D 37/02; B62D 25/02
USPC ........................................... 296/180.1, 180.5
See application file for complete search history.

(56) References Cited

U.S. PATENT DOCUMENTS

| 3,776,587 | A | 12/1973 | Oxlade |
| 4,119,339 | A | 10/1978 | Heimburger |
| 4,489,806 | A | 12/1984 | Shimomura |
| 7,717,494 | B2 | 5/2010 | Nagahama |
| 8,731,781 | B2 | 5/2014 | Prentice |
| 9,713,947 | B2 | 7/2017 | Irwin et al. |
| 9,738,328 | B2 | 8/2017 | Fahland et al. |
| 9,783,247 | B2 | 10/2017 | Kim |
| 2013/0238198 | A1 | 9/2013 | Prentice |
| 2014/0097638 | A1 | 4/2014 | Froling et al. |
| 2019/0202504 | A1 | 7/2019 | Mandl et al. |

FOREIGN PATENT DOCUMENTS

| EP | 3006249 A1 | 4/2016 |
| FR | 2856974 A1 | 1/2005 |
| FR | 3012107 A1 | 4/2015 |
| JP | H01249582 A | 10/1989 |

(Continued)

OTHER PUBLICATIONS

International Search Report for PCT/IB2017/053008 dated Aug. 10, 2017.

(Continued)

*Primary Examiner* — Joseph D. Pape
(74) *Attorney, Agent, or Firm* — Warn Partners, P.C.

(57) ABSTRACT

An active underbody panel system having a frame arrangement mounted under the vehicle and at least one deployable panel moveable between stowed and deployed positions to improve aerodynamics under the vehicle. A deployment/retraction mechanism is provided having a pair of linkage assemblies and driven by an actuator, which allows the deployable panel(s) to be moved automatically downward into the air flow as needed.

18 Claims, 4 Drawing Sheets

(56) References Cited

FOREIGN PATENT DOCUMENTS

| JP | 2008230470 A | 10/2008 |
|----|--------------|---------|
| JP | 2009220689 A | 10/2009 |
| WO | 20150191711 A2 | 12/2015 |
| WO | 20160020424 A1 | 2/2016 |
| WO | 20170199231 A1 | 11/2017 |

OTHER PUBLICATIONS

Supplementary European Search Report for EP17798871 dated Apr. 2, 2019.

ACTIVE UNDERBODY PANEL SYSTEMS

CROSS-REFERENCE TO RELATED APPLICATIONS

This application is a continuation application of U.S. patent application Ser. No. 17/022,484, filed Sep. 16, 2020, which is a continuation application of U.S. patent application Ser. No. 16/303,001, filed Nov. 19, 2018, issued as U.S. Pat. No. 10,814,922, which is a National Stage of PCT International Application No. PCT/IB2017/053008, filed May 22, 2017, which claims the benefit of U.S. Provisional Patent Application No. 62/339,259, filed May 20, 2016. The disclosures of the above applications are incorporated herein by reference.

FIELD OF THE INVENTION

The present invention relates to a deployable aerodynamic panel system for attachment to a vehicle.

BACKGROUND OF THE INVENTION

Improved vehicle fuel economy is highly desirable. Fuel economy is one of the primary considerations for manufacturers and consumers, and there is increasingly more emphasis and regulations on such environmental impacts as vehicle fuel economy/mileage. One of the ways to improve fuel economy is to decrease the weight of the vehicle. Another way is to improve vehicle aerodynamics. The airflow at the underside of the vehicle or "drag" effects fuel economy. A lower aerodynamic efficiency decreases fuel economy, particularly in vehicles with higher ground clearances due to the greater drag under the vehicle.

There are known under-vehicle panels that seek to improve aerodynamic. Static under-vehicle panels aim to improve the air flow, but are limited in benefit due to the vehicle ground clearance requirements at low speeds. If the static panel is set too low—it will hit or bottom out on objects and elevated ground surfaces.

Another typical under-vehicle panel includes active suspension systems that allow the vehicle to be lowered closer to the ground at high speed limiting the under vehicle air flow, but these are expensive and carry a high mass penalty.

Typical active front deflectors have a similar effect, but are limited to the front of the vehicle and do not provide the same benefit to vehicles that already have underbody panels.

Typical systems do not improve vehicle fuel economy. Typical systems fail to reduce vehicle drag without compromising the vehicle's low speed requirements for maneuvering. In addition, typically, when increased cooling efficiency at high speeds is desired, larger cooling systems and/or grille openings are needed.

It is therefore desired to provide a panel mountable under the vehicle that is deployable to provide drag reduction.

SUMMARY OF THE INVENTION

The present invention generally relates to an active underbody panel system including a frame structure and at least one deployable panel connected to the frame structure and moveable between at least a stowed position and deployed position. A deployment/retraction mechanism is provided, such as at least one linkage assembly, connected to the frame structure, which moves the panel(s) generally up and down (or otherwise moved) into the air flow as needed. An actuator drives the movement of the mechanism, and, therefore the panel(s) operably connected to the mechanism. In a preferred embodiment, at least two deployable panels are provided and automatically deploy under predetermined conditions (such as predetermined higher speeds) and retract under other conditions (such as at predetermined lower speeds or when an object is detected).

The system generally improves aerodynamic drag under the vehicle, improves aerodynamic lift/down force distribution between front and rear axles, increases mass air flow through the engine compartment at high speed, maintains ground clearance at low speed, and minimizes mass increase.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
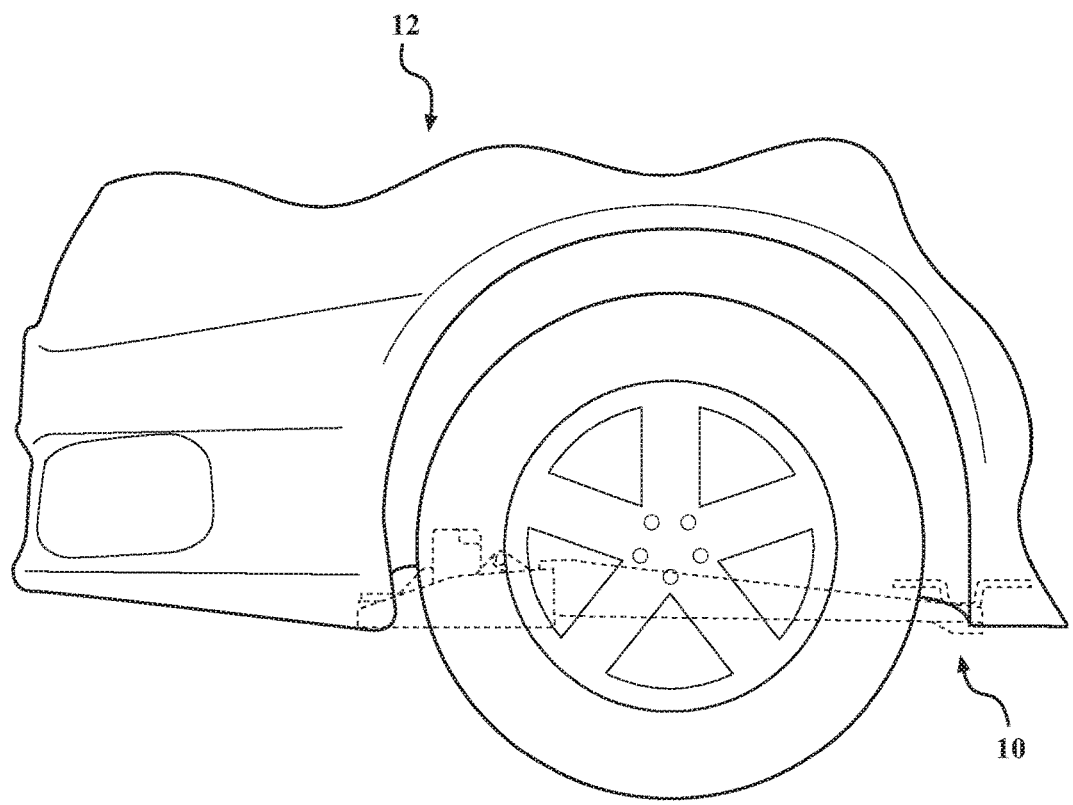
FIG. 1A is a side elevation of an active underbody panel assembly mounted on a vehicle in an exemplary fore-aft location, the panel shown in a stowed position, in accordance with one embodiment of the present invention.

The following description of the preferred embodiment(s) is merely exemplary in nature and is in no way intended to limit the invention, its application, or uses.

Referring to FIGS. 1A-4 generally, in accordance with the present invention, there is provided an active underbody panel assembly generally shown at 10 for a vehicle generally shown at 12. The assembly 10 moves between at least a retracted or "stowed" position (FIG. 1A) and a deployed position or "extended" position (FIG. 1B). At least one active underbody panel assembly 10 is mounted to the underbody of the vehicle in a predetermined location, adjacent at least one axle of the vehicle, in a predetermined direction, e.g. fore/aft.

At least one body panel is provided attached to a frame structure. Preferably, the body panel portion is multi-panel. In one embodiment, the assembly has at least two body panels connected to the frame. Preferably, the assembly 10 has a first body panel 14 and second body panel 16 connected to a frame shown generally at 18. Most preferably, the first body panel 14 is a front panel and the second body panel 16 is a rear panel with respect to the underbody panel assembly 10 mounted to the underbody of the vehicle 12 in a fore/aft orientation.

The frame structure 18 include at least a first framing structure 20 and a second framing structure 22. The frame 18 also includes a first panel frame structure 21 that is connected to the first panel 14 and to the first framing structure 20. The frame further includes a second panel frame structure 23 that is connected to the second panel 16 and to the second framing structure 22.

The first framing structure 20 is connected to at least the first panel frame structure 21 by a plurality of fasteners in apertures, e.g. pins 15 (and/or bolts, screws or any other suitable fasteners and combinations thereof within flange apertures 17 of the first framing structure 20 and apertures 19 in the first panel frame structure 21). The second framing structure 22 is connected to at least the second panel frame structure 23 by a plurality of fasteners in apertures, e.g. pins 25 (and/or bolts, screws or any other suitable fasteners and combinations thereof).

In an alternative embodiment, an at least partially integrally formed frame 18 is also contemplated without departure from the scope of the present invention. Bonding of framing structures is also contemplated without departure from the scope of the present invention. A composite frame 18 is also contemplated without departure from the scope of the present invention.

The first and second framing structures 20,22 are mounted to the vehicle underbody using a plurality of fasteners, e.g., bolts, screws, or any other suitable fastener, in a plurality of apertures 27 and 29, respectively.

A deployment/retraction mechanism shown generally at 26 is operably connected to the first framing structure 20 and second panel frame structure 23, preferably near the rear of the first framing structure 20 and near the front 30 of the second panel frame structure 23. This allows the frames 20 and 23, and therefore the first and second panels 14,16, to move relative to each other. In particular, the mechanism 26 mimics a sliding motion between the first and second panels 14,16.

The deployment/retraction mechanism 26 is a linkage unit having at least two linkage assemblies shown generally at 32,32 including at least a first link 28, second link 31, and third link 33. The linkage assemblies 32,32 are connected to a rod or drive shaft 34. The first link 28,28 of each of the linkage assemblies 32,32 is pivotally connected to a bracket 42,42 on the second panel frame structure 23. The second link 31,31 of each of the linkage assemblies is connected to a respective first link 28,28. The second link 31,31 are also connected to the rod or drive shaft 34. The third link 33,33 of each of the linkage assemblies is connected to at least the drive shaft 34. The drive shaft is connected to the first frame structure 20, preferably, via two apertures 44 formed in the structure 20 to receive the ends of the drive shaft 34 for rotation. The linkages 32,32 cooperate to move the first and second panels 14,16 under predetermined conditions between the deployed and retracted positions.

More or less linkage assemblies 32 and links are contemplated depending on the particular application without departure from the scope of the present invention.

At least one actuator shown generally at 36 is also connected to the drive shaft 34. The actuator drives rotation of the rod 34 with the pair of linkage assemblies 32 to drive the panels 14,16 generally downward to the deployed position to improve aerodynamics and generally upward to the stowed position when desired. Typically, the actuator 36 is also operably connected to a mounting bracket 38 on the first framing structure 20, e.g., by a plurality of fasteners 39 such as screws, bolts, etc. When the actuator rotates the drive shaft 3 in a first direction, the second link 31 is rotated generally downward causing the first link 28 and second panel 28 connected to the link 28 to move generally downward into the air flow. The first panel 14 is also rotated generally downward into the air flow. Since both the first and second panels 14,16 are fixed at one end, via the first and second frames 20,22 connected to the underbody of the vehicle, the panels will be at predetermined angles when in the deployed position.

Most preferably, the panels 14,16 move relative to each other in a transition region indicated generally at 40. This angles the panels a predetermined amount (as indicated with respect to a horizontal plane 'L' in FIG. 2B) into the underbody air flow. Generally, the angle between 'L' and the first panel 14 is at least about 15 degrees, typically, 10-90°, preferably, 10-45°, most preferably, 15-30°. Generally, the angle between 'L' and the second panel 16 is at least about 10 degrees, typically, 15-90°, preferably, 10-45°, most preferably, 10-30°. In general, when in the deployed position, a high pressure zone of air flow is adjacent the front panel 14 and a low pressure zone is adjacent the rear panel 16.

The panels 14,16 are also removable for vehicle 12 service or replacement of damaged panels without having to remove the mechanism 26 or framing structure 18.

The frame 18 components and the deployment/retraction mechanism 26 form an articulated skeleton framework structure secured to the vehicle underbody. The support frame 18 is operably secured to the vehicle generally to the vehicle underbody with a plurality of fasteners, in a preferred embodiment. According to an embodiment of the present invention, the first and second panels 14,16 are then operably attached to this structure 18.

The body panels 14,16 can use the existing or modified vehicle panels attached to the frame 18 and mechanism 26, which allows the panels 14,16 to be moved generally up and down into the air flow as needed. The only additional mass is for the frame 18 and mechanism 26. The active underbody panel assembly 10 allows panels/frame to be retracted to provide the vehicle's 12 original ground clearance under predetermined conditions, such as at low speed. A conventional fixed system would be damaged at this lower ground clearance or it would have to be higher and provide less benefit. In one embodiment, the active panels 14,16 are more suited to vehicles that already have underbody panels and provide more benefit than adding an active front deflector. Conventional underbody panels aim to improve the air flow, but are limited in benefit due to vehicle ground clearance requirements at low speed.

The assembly 10 of the present invention is also lighter and more cost effective than active suspension systems.

According to an embodiment of the present invention, by placing a plurality of vent holes 46 in at least one of the panels, e.g. most preferably toward the front of the second panel 16, the mass air flow through the engine compartment can be increased without increasing the grille opening or cooling system, which can result in a reduction of cooling system size. In a preferred embodiment, the venting is behind the aerofoil to increase mass air flow through the engine and cooling system.

The panels 14,16 also preferably have upward sides 52 and 50 that are generally vertical and located in the fore/aft direction.

According to one embodiment, the active underbody panel assembly 10 is attached to the underside of the vehicle and acts like a static fixed panel at low speed. At low speed, the vehicle 12 has the required ground clearance and approach angles as it would with a static panel. At high speed, the system will deploy down into the underbody air flow (e.g. FIG. 2B). This will have the same effect as if the vehicle was lower to the ground by preventing some of the air from passing under the vehicle and instead around it, which reduces draft. The pressure difference created by the deployed underbody panel will also increase the down force (depending on position). The low pressure behind it and the vents in the rear panel, e.g., second panel 16, will cause the hot air from the engine compartment increasing mass air flow through the cooling system resulting in possible decrease in cooling requirements.

The actuator 36 is contemplated, e.g., a rotary actuator, e.g., with feedback options, hex-type, screw-type drive, higher speed actuator, electric, mechanical, linear, e.g., with current override circuits, declutching, hydraulic, pneumatic, extending, power lift actuator, or any other actuators and combinations thereof depending on the application and predetermined vehicle needs.

In a preferred embodiment, the actuator 36 is clutched, e.g., a sealed, clutchable actuator, so that in the event of an impact, it is able to absorb that force without damaging the actuator 36 or mechanism 26.

A non-limiting example of an actuator 36 has internal clutching that reacts to certain predetermined conditions by de-clutching or disengages gears allowing the panels 14,16 to stop deployment to help prevent damage to the assembly 10. Upon impact to the panels 14,16, the actuator 36 will clutch to disengage the gearing so that the panels 14,16 can rotate or move freely out of the way. Typically, the actuator 36 senses current spikes and causes the actuator 36 to react to certain conditions. The clutchable actuator 36 is sealed and has communication capability with the vehicle 12. The actuator 36 and the vehicle 12 also communicate to deploy and retract the panels 14,16 based upon predetermined conditions such as vehicle speed, wind direction, yaw, etc, and combinations thereof. By way of non-limiting example, the panels 14,16 are retracted until the vehicle reaches a predetermined speed of at least 30 miles per hour, preferably, about 30-40 mph, then the deflector panels 14,16 deploy and stay deployed until the vehicle drops back down to below the predetermined speed or other predetermined conditions for continued deployment are no longer met.

Suitable electronics most preferably, a shut off printed circuit board (PCB) with connector contacts correlate with vehicle communication networks for commanding a motor based upon predetermined conditions, e.g., commanding energizing of the motor correlating with predetermined vehicle speed ranges. The PCB electronics senses current spike for override, which allows the clutch to disengage the drive system allowing it to rotate freely.

In the event that an object strikes one of the panels 14,16 in the deployed position the system is designed to absorb the energy, but if the impact exceeds a predetermined set level it is released by the actuator's internal clutch allowing it to move with the impact preventing damage to the actuator 36 and deployment/retraction mechanism.

The first and second panels 14,16 are stiff, flexible/stretchable, rigid or semi-rigid and/or combinations thereof, most preferably, being made of composite plastic. In another embodiment, a single panel is used. In yet another embodiment, more than two panels are used. In yet another embodiment, a single piece of flexible/stretch material is used. However, depending on the particular application, it is also within the scope of the invention to manufacture the panels of materials such as aluminum, painted carbon fiber, lightweight moldings of suitable material, twin sheet moldings of suitable material or other suitable material depending on application requirements, e.g., durability, weight, etc, without departing from the scope of the invention.

Figure 1B:
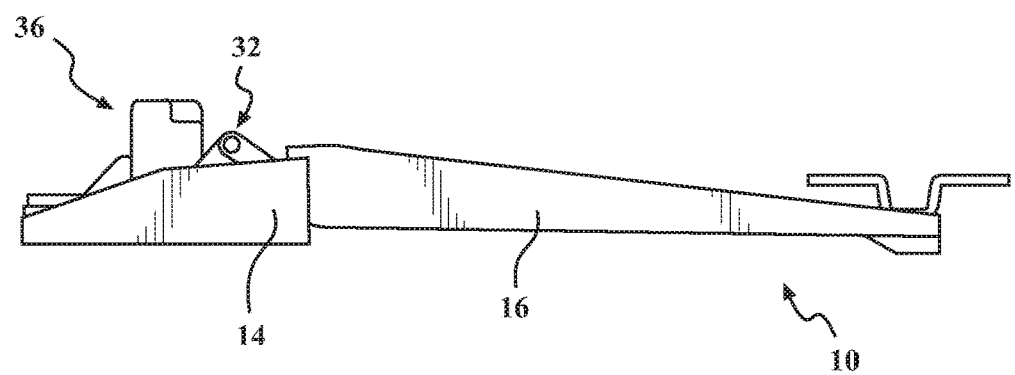
FIG. 1B is a side elevation of the active underbody panel assembly of FIG. 1A.

FIGS. 1A-1B illustrate a non-limiting example of the underbody panel mounting location showing the retracted position for low speed. In a preferred embodiment, the assembly 10 is positioned generally between the rear tires. However, the assembly 10 is positioned under the vehicle, and the location fore/aft is dependent on the vehicle and the desired benefit of down force or drag reduction. Accordingly, any suitable under vehicle location is within the scope of the present invention. One or more assemblies are used 10, e.g., at the front and/or rear axle. In another more preferred embodiment, one assembly 10 is used, which is mounted generally near the front or rear axle. Any underside mounting location(s) is/are contemplated depending on the vehicle and desired down force or drag reduction without departing from the scope of the present invention.

Figure 2A:
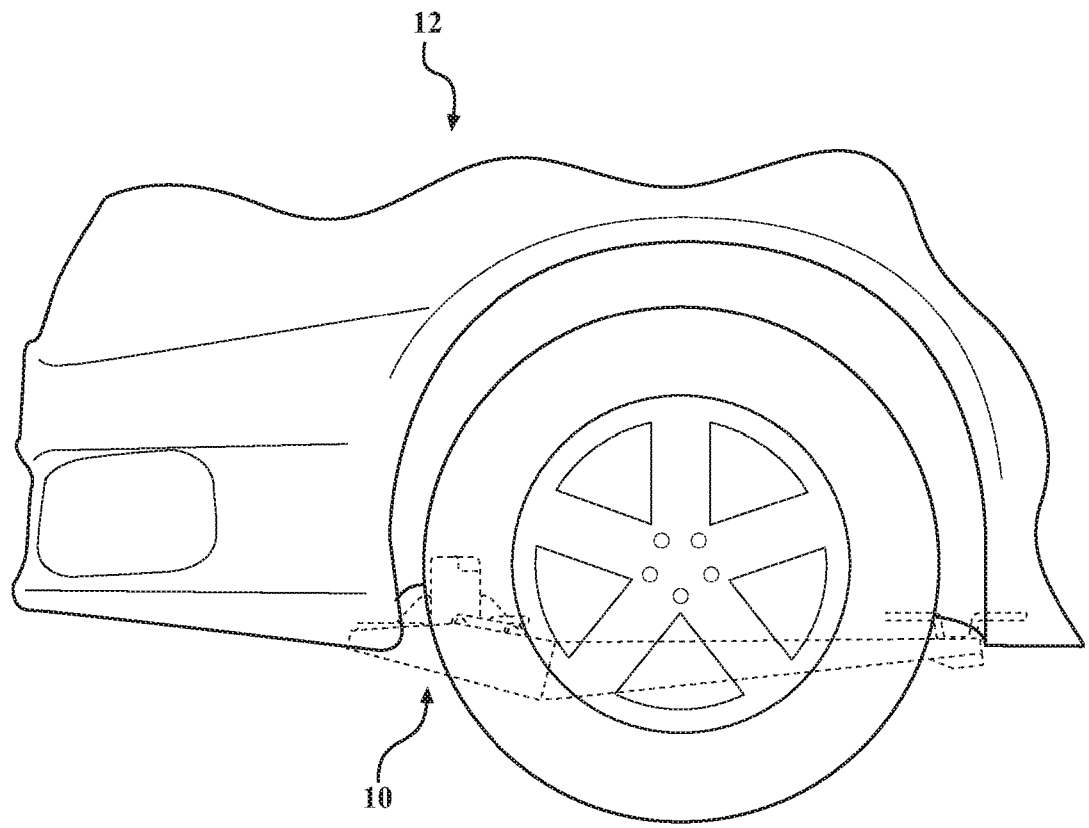
FIG. 2A is a side elevation of the active underbody panel assembly of FIG. 1A shown in a deployed position, in accordance with an embodiment of the present invention.
Figure 2B:
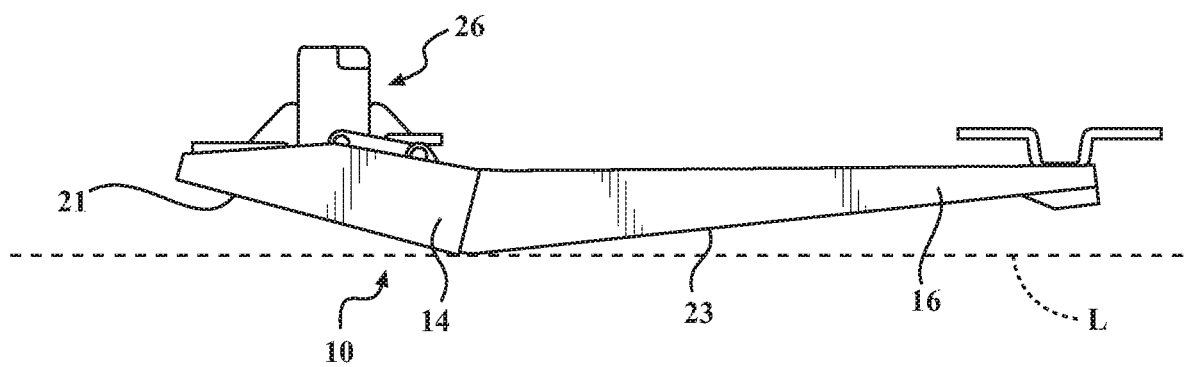
FIG. 2B is a side elevation of the active underbody panel assembly of FIG. 2B.
Figure 3:
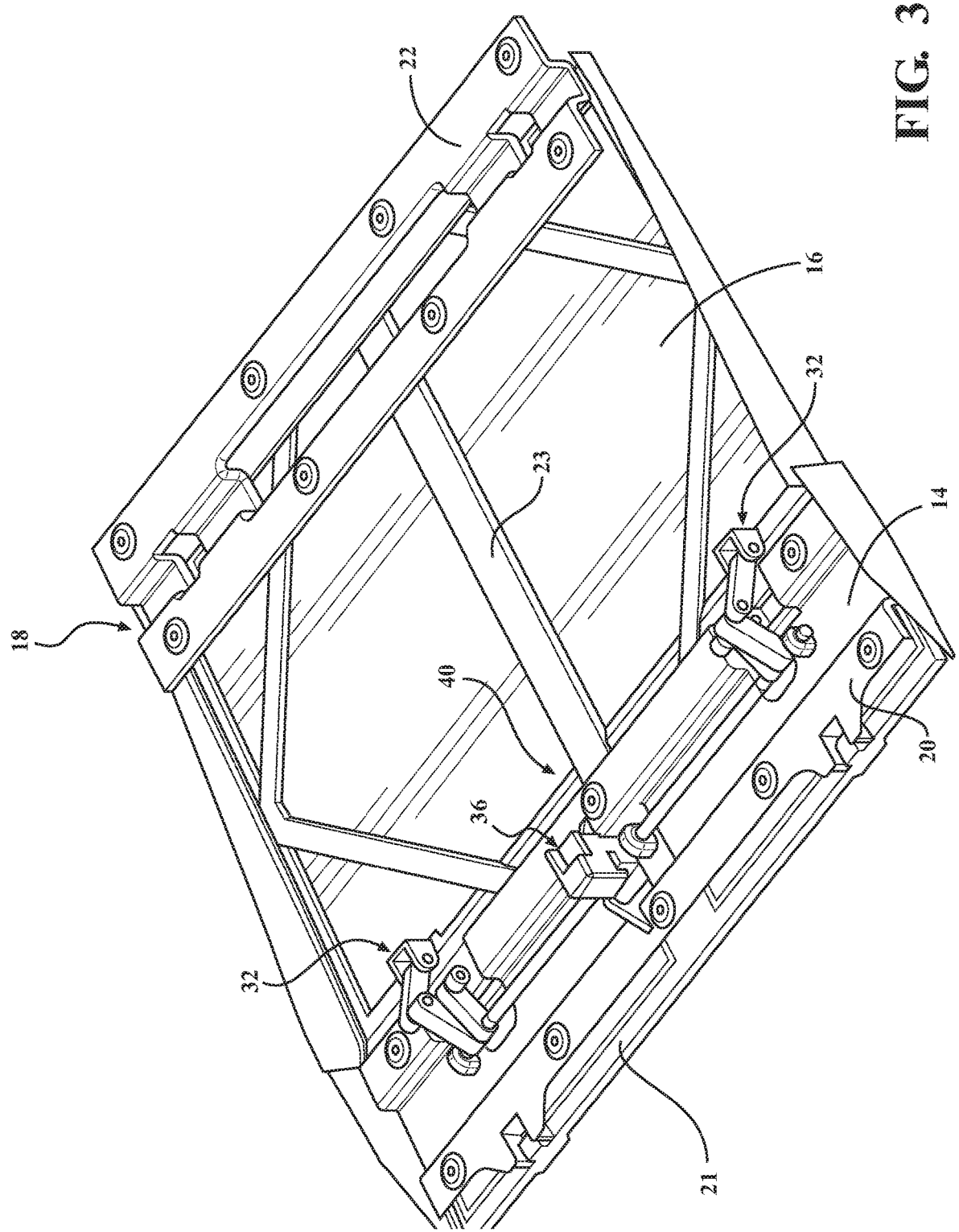
FIG. 3 is a perspective view of the active underbody panel assembly for mounting to the vehicle, according to the present invention; and, FIG. 4 is an exploded view of the active underbody panel assembly of FIG. 3, according to the present invention.
Figure 4:
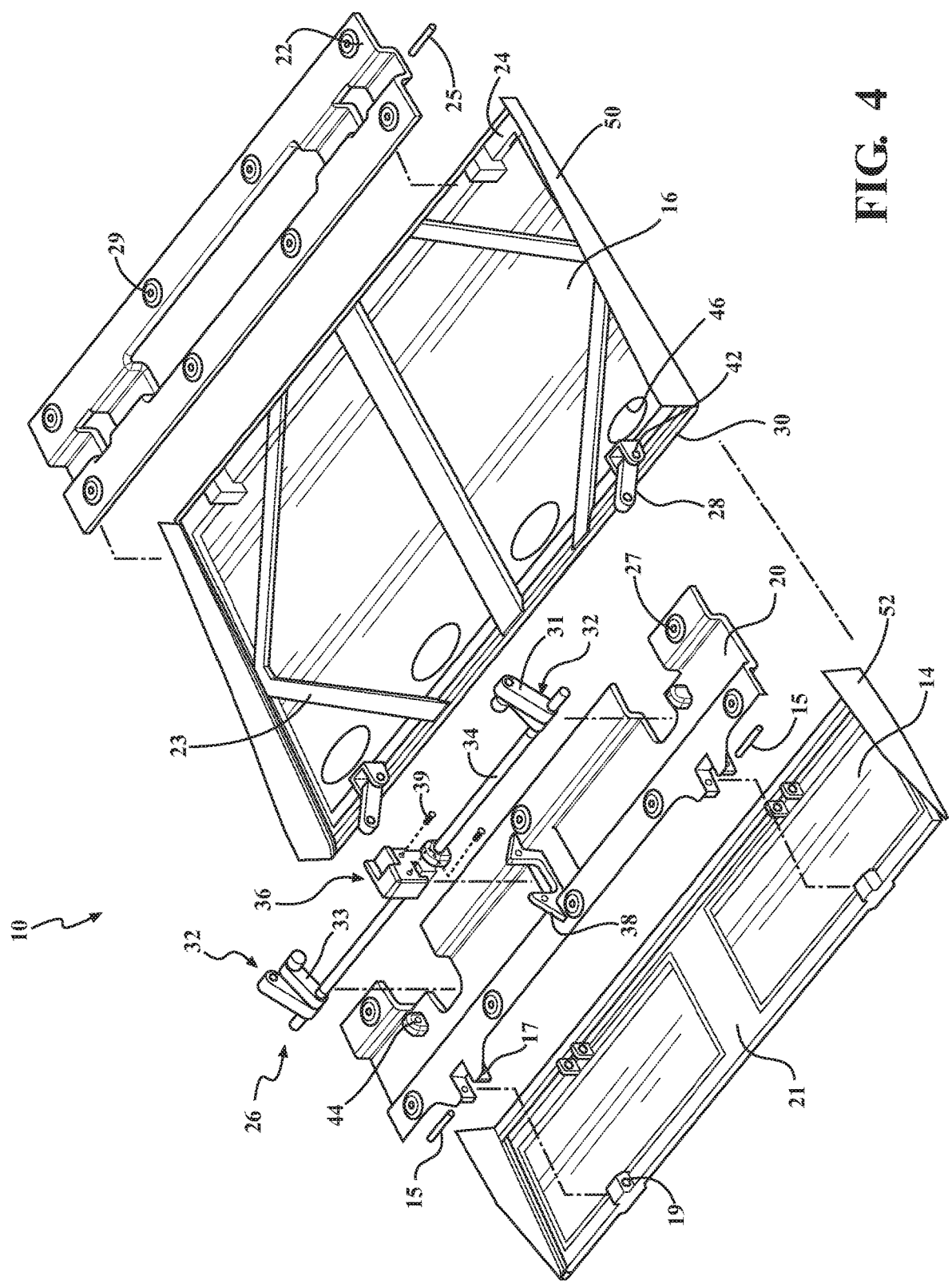

In one embodiment, the forward and rearward edges of the frame 20,22 are fixed. FIGS. 2A-2B illustrate a non-limiting example of the deployed position for high speed, where the mechanism 26 has driven the rearward edge of the first panel 14 downward, which in turn pulled the forward edge of the second panel 16 downward (or vice versa), causing the first and second panels 14,16 to move out of generally horizontal at the retracted position to predetermined angles in the deployed position. Other underbody attachment locations and deployment positions/panels/angles are contemplated depending on the application without departing from the scope of the present invention.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. An active underbody panel assembly adapted for a vehicle, comprising:
   a support frame adapted to operably mount to an underside of the vehicle;
   at least one deployment/retraction mechanism operably coupled to the support frame;
   at least one deployable panel operably connected to the support frame; said at least one deployable panel comprising at least one first panel and at least one second panel that selectively move relative to each other between a stowed position and a deployed position; and
   at least one actuator operably coupled to the deployment/retraction mechanism, said actuator automatically moves predetermined portions of the support frame under predetermined conditions to move the at least one deployable panel between the stowed position and the deployed position,
   wherein said at least one first panel is lowered from a substantially horizontal plane to a predetermined angle when in the deployed position and said at least one second panel is lowered from a substantially horizontal plane to a predetermined angle when in the deployed position.

2. The active underbody panel assembly of claim 1, wherein the portions of the support frame includes a first panel frame structure connected to the first panel and a second panel frame structure connected to the second panel.

3. The active underbody panel assembly of claim 2, wherein the support frame further includes a first framing structure connected to the first panel frame structure and a second framing structure connected to the second panel frame structure, wherein the first and second framing structures are mounted to the underbody of the vehicle.

4. The active underbody panel assembly of claim 1, wherein the deployment/retraction mechanism includes at least two linkage assemblies operably coupled to a drive shaft, wherein the actuator drives rotation of the drive shaft to move the at least two linkage assemblies causing the at least one deployable panel to move between the stowed and deployed positions.

5. The active underbody panel assembly of claim 4, wherein the at least two linkage assemblies each comprises a first link connected to a second panel frame structure of the frame support, a second link coupled to the drive shaft and to a first panel frame structure of the frame support, and a third link connected to the first link and connected to the drive shaft, for rotation between the stowed and deployed positions.

6. The active underbody panel assembly of claim 1, wherein the actuator is a clutched actuator to prevent damage to the actuator or deployment/retraction mechanism.

7. The active underbody panel assembly of claim 1, wherein the actuator senses current spike upon impact with the object causing circuit override for declutching so that the at least one deployable panel moves freely out of the way.

8. The active underbody panel assembly of claim 1, wherein the predetermined conditions are selected from the group consisting of vehicle speed, wind direction, yaw and combinations thereof.

9. The active underbody panel assembly of claim 1, wherein the vehicle speed predetermined condition for deployment of the assembly to the deployed position is reaching a vehicle speed in the range of about 30-40 miles per hour.

10. The active underbody panel assembly of claim 1, wherein the predetermined condition for retraction to the retracted position is dropping below a speed in the range of about 30-40 miles per hour or sensing impact with an object.

11. The active underbody panel assembly of claim 1, wherein the at assembly is mounted in a fore-aft location adjacent an axle of the vehicle.

12. The active underbody panel assembly of claim 1, further comprising at least one vent aperture formed through the at least one deployable panel for increased air flow through an engine compartment.

13. An active underbody panel assembly adapted for a vehicle, comprising:
    a support frame operably adapted to mount to an underside of the vehicle and including at least two rotatable portions;
    at least two linkage assemblies operably coupled to the support frame;
    a first panel connected to the support frame;
    a second panel connected to the support frame;
        at least one actuator connected to the at least two linkage assemblies to selectively move the first and second panels between stowed position and deployed positions, wherein said first panel is lowered from a substantially horizontal plane to a predetermined angle when in the deployed position and said second panel is lowered from a substantially horizontal plane to a predetermined angle when in the deployed position.

14. The active underbody panel assembly of claim 13, wherein the support frame further comprises:
    a first framing structure operably connected to a first panel frame structure, wherein the first panel is operably coupled to the first panel frame structure; and,
    a second framing structure operably connected to a second panel frame structure, wherein the second panel is operably coupled to the second panel frame structure;
    wherein the first and second panels move relative to one another when the actuator rotates the drive shaft.

15. The active underbody panel assembly of claim 14, wherein the first framing structure and second framing structure are directly mounted to the underside of the vehicle.

16. The active underbody panel assembly of claim 14, further comprising at least one vent aperture formed through the second panel for increased air flow through an engine compartment.

17. The active underbody panel assembly of claim 14, wherein the first and second panels are semi-rigid.

18. An active underbody panel assembly adapted to be mounted underneath a vehicle body, comprising:
    a first framing structure operably connected to a first panel frame structure,
    a first panel for aerodynamics connected to the first panel frame structure, said first panel selectively deploys into an air flow and retracts out of the air flow;
    a second framing structure operably connected to a second panel frame structure;
    a second panel for aerodynamics connected to the second panel frame structure, said second panel selectively deploys into an air flow and retracts out of the air flow, wherein said first panel is in a high pressure side of airflow acting on the active underbody panel assembly, and wherein the second plane is in low pressure side of airflow underneath the vehicle, and wherein said first panel is lowered from a substantially horizontal plane to a predetermined angle when in the deployed position and said second panel is lowered from a substantially horizontal plane to a predetermined angle when in the deployed position;
    at least two linkage assemblies operably coupled to the first framing structure and second frame structure;
    an actuator connected to a drive shaft, said drive shaft connected to the at least two linkage assemblies, wherein the actuator deploys the first and second panels under predetermined conditions and retracts the first and second panels under predetermined conditions, wherein the predetermined conditions are selected from the group consisting of vehicle low speed, vehicle high speed, forces/loads, current spikes, wind direction, yaw and combinations thereof.

* * * * *